US012708187B2

(12) United States Patent
Chartier et al.

(10) Patent No.: US 12,708,187 B2
(45) Date of Patent: Aug. 18, 2026

(54) STICK OF COSMETIC PRODUCT COMPRISING TWO COMPOSITIONS HAVING A SURFACE IN RELIEF, METHOD AND DEVICE FOR MANUFACTURING SUCH A STICK OF COSMETIC PRODUCT

(71) Applicant: PARFUMS CHRISTIAN DIOR, Paris (FR)

(72) Inventors: Thierry Chartier, Chaingy (FR); Rémi Barrault, Saint Jean de Braye (FR)

(73) Assignee: PARFUMS CHRISTIAN DIOR, Paris (FR)

( * ) Notice: Subject to any disclaimer, the term of this patent is extended or adjusted under 35 U.S.C. 154(b) by 24 days.

(21) Appl. No.: 18/417,869

(22) Filed: Jan. 19, 2024

(65) Prior Publication Data

US 2024/0245197 A1 Jul. 25, 2024

Related U.S. Application Data

(63) Continuation of application No. 16/612,237, filed as application No. PCT/FR2018/051117 on May 3, 2018, now abandoned.

(30) Foreign Application Priority Data

May 9, 2017 (FR) ..................................... 17 54064

(51) Int. Cl.
*A45D 40/16* (2006.01)
*A45D 40/00* (2006.01)
*B29C 39/02* (2006.01)

(52) U.S. Cl.
CPC ............ *A45D 40/16* (2013.01); *B29C 39/023* (2013.01); *B29C 39/026* (2013.01); *A45D 2040/0012* (2013.01)

(58) Field of Classification Search
CPC ............ A45D 40/16; A45D 2040/0012; B29C 39/023; B29C 39/026; A61K 8/0229; A61Q 1/06
See application file for complete search history.

(56) References Cited

U.S. PATENT DOCUMENTS 1,576,567 A * 3/1926 Buhl-Bonanno ...... A45D 40/02 401/35
2,566,722 A * 9/1951 Friedberg ............... A45D 40/16 106/245

(Continued)

FOREIGN PATENT DOCUMENTS

CN 104520088 A 4/2015
DE 4442197 C1 2/1996

(Continued)

OTHER PUBLICATIONS

Second Japanese Notice of Reasons for Rejection related to Application No. 2022-171300; reported on Feb. 13, 2024.

(Continued)

*Primary Examiner* — Donnell A Long

(57) ABSTRACT

Stick of cosmetic product, in particular of lipstick, comprising two compositions A and B extending along a longitudinal axis, method and device for manufacturing such a stick of cosmetic product, the stick of cosmetic product, the stick of cosmetic product having a side surface presenting a decorative surface portion in relief.

14 Claims, 11 Drawing Sheets

(56) References Cited

U.S. PATENT DOCUMENTS

| | | | | | |
|---|---|---|---|---|---|
| 2,626,847 | A * | 1/1953 | Brown | A45D 40/02 | 424/DIG. 5 |
| 2,628,624 | A * | 2/1953 | De Mario | A45D 40/24 | 401/35 |
| 3,192,933 | A | 7/1965 | Prince | | |
| 3,201,314 | A * | 8/1965 | Morshauser | B29C 39/12 | 401/35 |
| 3,211,619 | A * | 10/1965 | Buchwalter | A61Q 1/06 | 424/DIG. 5 |
| 3,279,999 | A * | 10/1966 | Harrison | A61K 8/02 | 428/401 |
| 4,291,018 | A | 9/1981 | Oeda et al. | | |
| 5,183,349 | A * | 2/1993 | Kamen | A45D 40/02 | 401/35 |
| 5,200,173 | A * | 4/1993 | Kamen | C08J 7/123 | 427/535 |
| 6,022,209 | A | 2/2000 | Kuo | | |
| 7,967,518 | B2 * | 6/2011 | Hosokawa | A61K 8/92 | 401/88 |
| 8,579,529 | B2 * | 11/2013 | Pechko | A45D 40/24 | 401/17 |
| 8,662,776 | B2 * | 3/2014 | Porter | A45D 40/02 | 401/17 |
| 8,685,381 | B2 * | 4/2014 | Schlessinger | A61K 9/0014 | 424/59 |
| 9,022,042 | B1 * | 5/2015 | Fichtl | A45D 40/24 | 132/297 |
| 10,183,433 | B1 * | 1/2019 | Domenick | B29C 33/0022 | |
| 10,912,718 | B2 * | 2/2021 | Perrin | B29C 39/38 | |
| 12,239,208 | B2 * | 3/2025 | Akamatsu | A45D 40/20 | |
| 2002/0085983 | A1 | 7/2002 | Fleissman et al. | | |
| 2002/0086079 | A1 | 7/2002 | Kuo | | |
| 2005/0255136 | A1 | 11/2005 | Fleissman et al. | | |
| 2007/0295887 | A1 | 12/2007 | Kuo | | |
| 2009/0020912 | A1 | 1/2009 | Klein | | |

FOREIGN PATENT DOCUMENTS

| | | | |
|---|---|---|---|
| EP | 0712593 | A1 | 5/1996 |
| FR | 2417980 | A1 | 9/1979 |
| FR | 2823082 | A3 | 10/2002 |
| FR | 2911258 | A1 | 7/2008 |
| JP | 2000290139 | A | 10/2000 |
| JP | 2000300338 | A | 10/2000 |
| JP | 2002336040 | A | 11/2002 |
| JP | 2010531334 | A | 9/2010 |
| JP | 2013522227 | A | 6/2013 |
| JP | 2014516747 | A | 7/2014 |
| KR | 100317449 | B1 | 12/2001 |
| KR | 20110113277 | A | 10/2011 |
| WO | 0191605 | A1 | 12/2001 |
| WO | 2012161937 | A2 | 11/2012 |
| WO | 2016020442 | A1 | 2/2016 |

OTHER PUBLICATIONS

International Search Report related to Application No. PCT/FR2018/051117 reported on Jul. 31, 2018.

South Korean Office Action related to Application No. 10-2019-7035899; reported on Dec. 4, 2019.

Third Party Observation related to Application No. PCT/FR2018/051117; submitted on Aug. 28, 2019.

Japanese Notice of Reasons for Rejection related to Application No. 2019-562389; reported on Dec. 20, 2021.

First Chinese Office Action related to Application No. 201880046079.8; reported on Jul. 13, 2022.

First Chinese Office Action related to Application No. 202310308745.3; reported on Mar. 24, 2025.

Cool Xiaoqing, "2017 is the year to want this whitening lipstick, no longer just dark red and rosy brown lipstick colors" https://mp.weixin.qq.com/s/EeL60X0qNyyUGXx95wt63A, Mar. 4, 2017.

* cited by examiner

STICK OF COSMETIC PRODUCT COMPRISING TWO COMPOSITIONS HAVING A SURFACE IN RELIEF, METHOD AND DEVICE FOR MANUFACTURING SUCH A STICK OF COSMETIC PRODUCT

CROSS-REFERENCE TO RELATED APPLICATION

This application is a continuation patent application under 35 USC § 120 claiming priority to U.S. Non-Provisional patent application Ser. No. 16/612,237 filed on Nov. 8, 2019 which was a U.S. National Phase filing under 35 USC § 371 of International Application No. PCT/FR2018/051117 filed on May 3, 2018 and claims priority under the Paris Convention to French Patent Application No. 17 54064 filed on May 9, 2017.

FIELD OF THE DISCLOSURE

The present invention relates to sticks of cosmetic product, particularly lipstick or a product for the complexion, comprising two compositions and having a decorative surface portion in relief.

BACKGROUND

More particularly, the invention relates to a stick of cosmetic product comprising two compositions, for example of the type having a central part and a sheath, in particular a stick of lipstick having a central part and a sheath, having a decorative surface portion in relief, a central part-sheath type of method, and a device for manufacturing such a stick of cosmetic product. Note for the following that the invention relates to a stick of cosmetic product comprising at least two compositions, in other words it could comprise more than two different compositions.

Document FR2417980A1 discloses a stick of lipstick of the central part-sheath type and a device for manufacturing such a stick of lipstick.

However, the stick of lipstick described in FR2417980A1 does not have a decorative surface portion in relief and the device described does not enable manufacturing a central part-sheath type of lipstick with a decorative surface portion in relief. Indeed, the device comprises a rigid mold into which the stick of lipstick is poured or injected. Such a mold does not make it possible to create a decorative surface portion in relief on the sheath of the stick of lipstick. Indeed, when unmolding the stick of lipstick, a decorative surface portion in relief would rub against the mold and would be greatly altered.

Document FR2823082A3 discloses a stick of lipstick having a decorative surface portion in relief and a device for manufacturing such a stick of lipstick.

However, the stick of lipstick described in FR2823082A3 is not of the central part-sheath type and the device described does not make it possible to manufacture a stick of lipstick of the central part-sheath type having a decorative surface portion in relief. Indeed, the device comprises an elastic mold into which the stick of lipstick is poured or injected. Such a mold does not allow pouring or injecting two compositions to form a sheath surrounding a central part. Indeed, to do this, it is necessary to introduce a core into the mold, which abuts against the bottom of the elastic mold without the latter being deformed. The device described in FR2823082A3 does not allow ensuring such abutment.

SUMMARY

The present invention is intended in particular to produce a stick of cosmetic product comprising two compositions and which has a decorative surface portion in relief.

For this purpose, the stick of cosmetic product according to the invention, in particular of lipstick, comprises two compositions A and B extending along a longitudinal axis, the stick of cosmetic product having a side surface presenting a decorative surface portion in relief.

The compositions A and B may be different or identical; likewise they may be of different or identical texture; likewise they may be of different or identical color.

In preferred embodiments of the invention, one or more of the following may also be used:

- The stick of cosmetic product is of the central part-sheath type, the two compositions A and B being arranged relative to one another to form a central part surrounded by a sheath along the longitudinal axis, the sheath having a side surface presenting the decorative surface portion in relief;
- The stick of cosmetic product has a beveled free end;
- At the beveled free end, the sheath has a constant thickness around the central part;
- At the beveled free end, the central part is concentric with the sheath;
- The decorative surface portion in relief is protruding or recessed.

According to another aspect, the invention also relates to a method for manufacturing a stick of cosmetic product, in particular of lipstick, comprising two compositions A and B, extending along a longitudinal axis, the stick having a side surface presenting a decorative surface portion in relief, characterized in that the method implements:

- a step of placing a core in a cup having a surface portion in relief,
- a step of pouring or injecting a composition A between the core and the cup so as to form a first member,
- a step of removing the core from the cup,
- a step of pouring or injecting a composition B so as to form a second member, thereby forming a stick of cosmetic product, and
- a step of deforming the cup so as to demold the stick of cosmetic product.

The method may further comprise a step of lubricating the core.

According to another aspect, the invention also relates to a device for manufacturing a stick of a cosmetic product, in particular of lipstick, comprising two compositions A and B, extending along a longitudinal axis, the stick having a side surface presenting a decorative surface portion in relief.

The device according to the invention particularly enables the manufacture of a stick of cosmetic product, in particular of lipstick, of the central part-sheath type, extending along a longitudinal axis, comprising two compositions A and B arranged relative to one another to form a central part surrounded by a sheath along the longitudinal axis, the sheath having a side surface presenting a decorative surface portion in relief.

In preferred embodiments of the invention, one or more of the following may possibly also be used:

- The stick of cosmetic product, in particular of lipstick, is of the central part-sheath type, the two compositions A and B being arranged relative to one another to form a central part surrounded by a sheath along the longitudinal axis, the sheath having a side surface presenting the decorative surface portion in relief;

- The cup is of a size smaller than that of the cavity so as to define a space between the cup and the cavity, and the device comprises means for creating negative pressure in the space;
- The core has an air outlet channel leading between: the end of the core in contact with the beveled inner surface of the cup, and a portion of the core outside the cup when the core is inserted into said cup;
- The device further comprises pressure adjustment means for adjusting the pressure of the core in the cup; the pressure adjustment means may comprise a spring;
- The device further comprises a means for guiding in translation and for centering the core in the cup; the means for guiding in translation and for centering may be retractable;
- The core and the means for guiding in translation and for centering are mounted on a block;
- The device further comprises a magnetization means for maintaining in the retracted position the means for guiding in translation and for centering;
- The means for guiding in translation and for centering comprises a centering ring adapted to engage with a housing provided in the base;
- The device comprises a plurality of cavities, a plurality of elastic cups each having a surface in relief, and a plurality of cores, wherein the plurality of cavities are formed in the base, each of the cups being received in each cavity, and wherein each of the cores is movable in translation between an inserted position in which the cores are positioned in the cups and a withdrawn position in which the cores are withdrawn from the cups.

With these arrangements, it is possible to produce a stick of a cosmetic product, in particular lipstick, of the central part-sheath type having a decorative surface portion in relief, that is of good quality.

The pattern on this decorative surface portion may in particular represent a decorative and/or informative element, such as a decorative pattern, a logo, a trademark, a personalized inscription, etc.

BRIEF DESCRIPTION OF THE DRAWINGS

Other features and advantages of the invention will become apparent from the following description of one of its embodiments, given as a non-limiting example, with reference to the accompanying drawings. In the different figures, the same references designate identical or similar elements.

In the drawings:

FIGS. 1A and 1B represent a stick of cosmetic product 10 according to the invention. The stick of cosmetic product is in particular lipstick.

MORE DETAILED DESCRIPTION

The stick of cosmetic product 10 extends along a longitudinal axis X-X. The stick of cosmetic product 10 comprises two compositions A and B extending along a longitudinal axis X-X. The stick of cosmetic product 10 may be of the central part-sheath type, comprising two compositions A and B arranged relative to each other to form a central part 12 surrounded by a sheath 14 along the longitudinal axis X-X. In the following, the description is given for a stick of cosmetic product 10 of the central part-sheath type, but it is understood that the description is not limited to this type of stick of cosmetic product, but can be applied to any type of stick of cosmetic product 10 comprising two compositions A and B.

Compositions A and B are cosmetic products which are included in the composition of sticks of cosmetic product and which are preferably visually distinct.

Figure 1A:
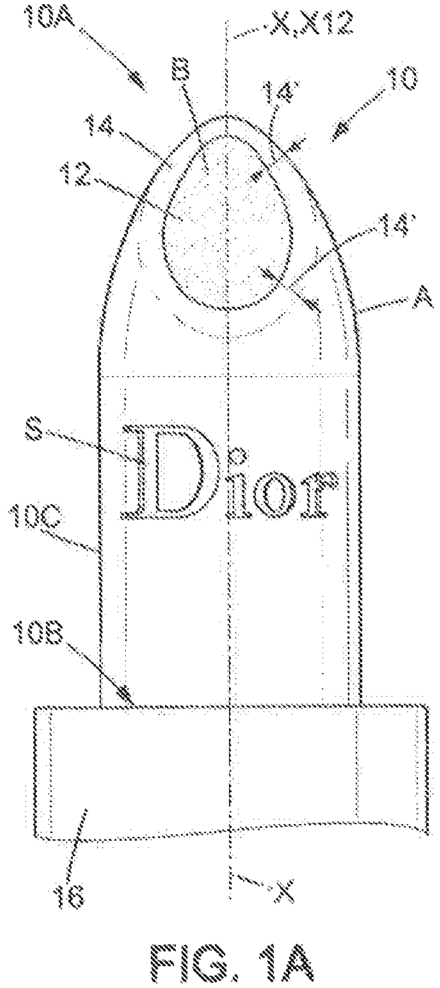
FIG. 1A is a front view of a stick of cosmetic product according to the invention.
Figure 1B:
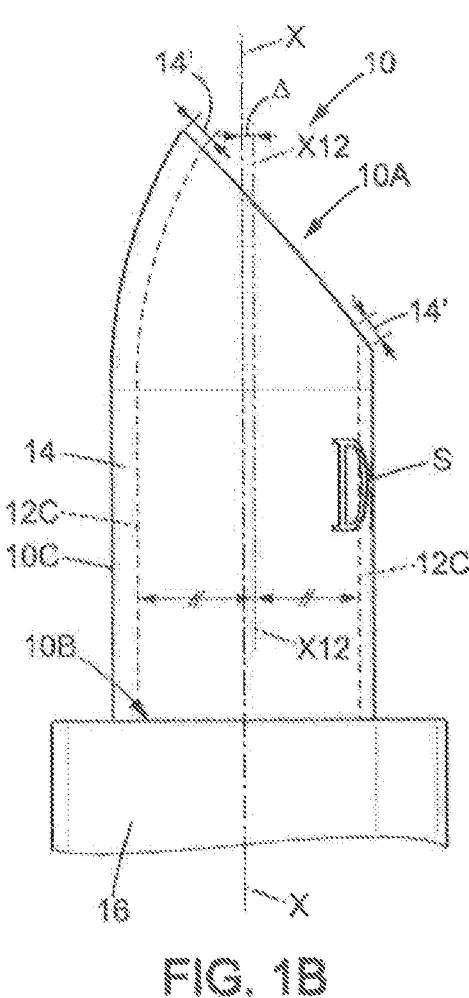
FIG. 1B is a side view of the stick of cosmetic product of FIG. 1A.
Figure 5:
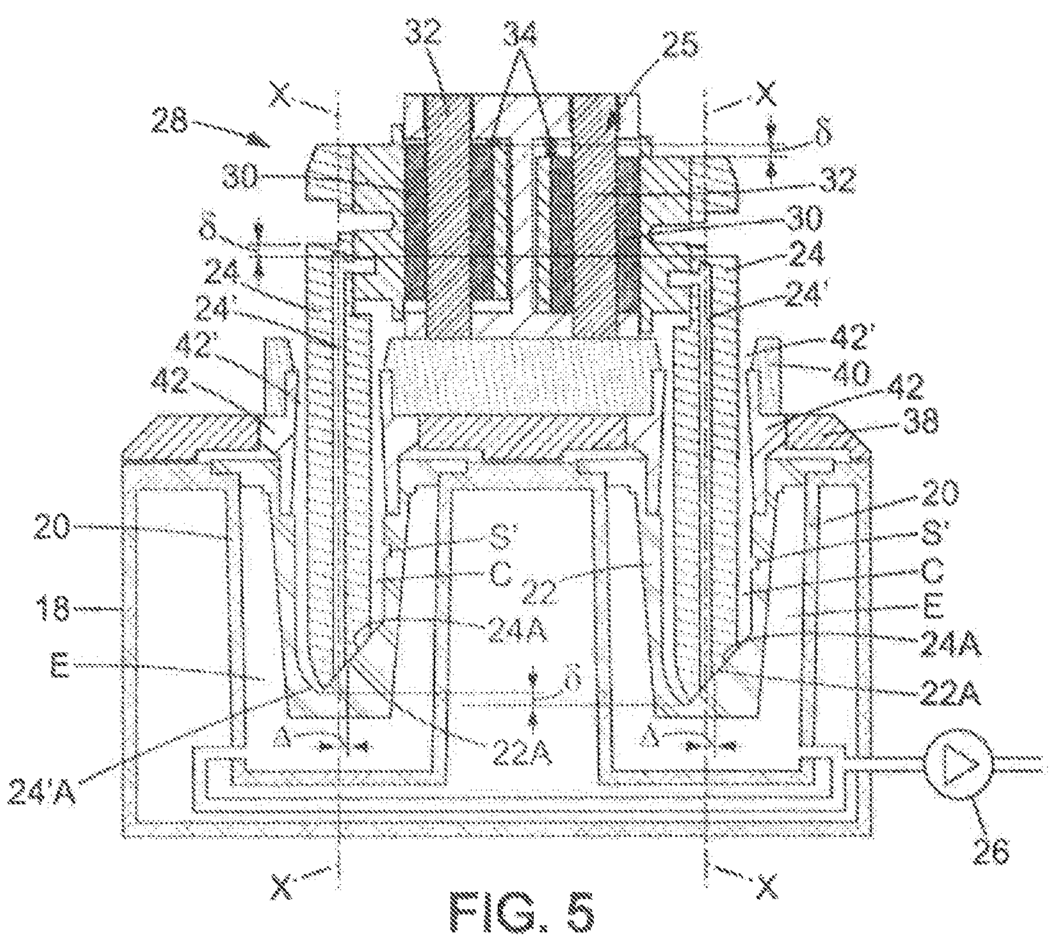
FIG. 5 is a sectional view of the device of FIG. 4 along line V-V.
Figure 6A:
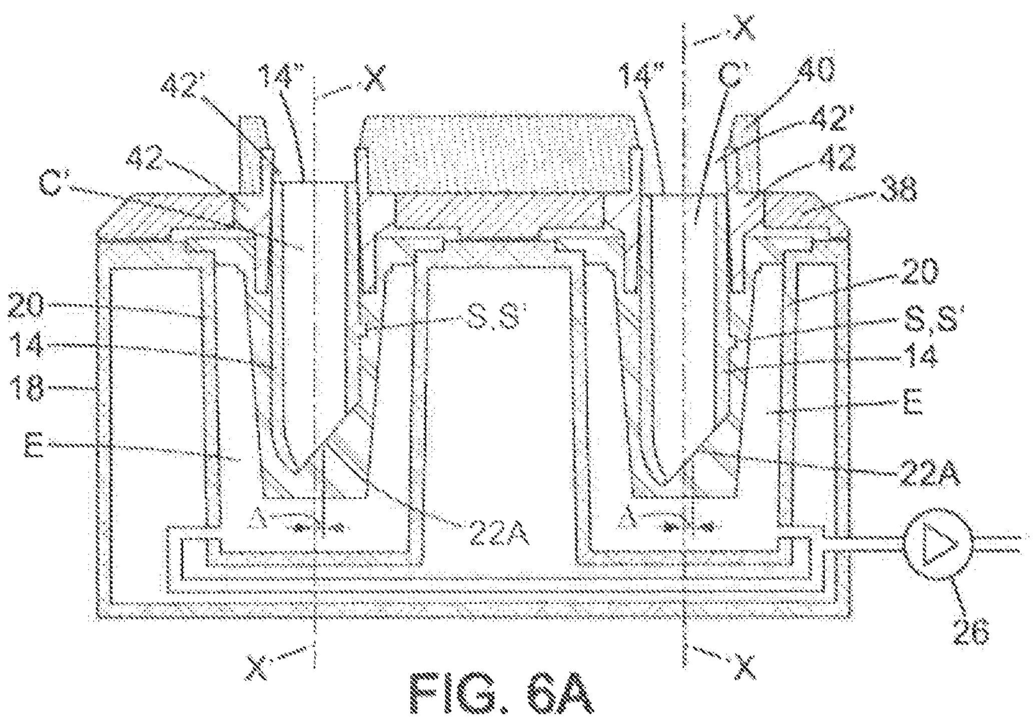
FIG. 6A is a sectional view of the base of the device of FIG. 5 with the sheath poured in the cup.
Figure 6B:
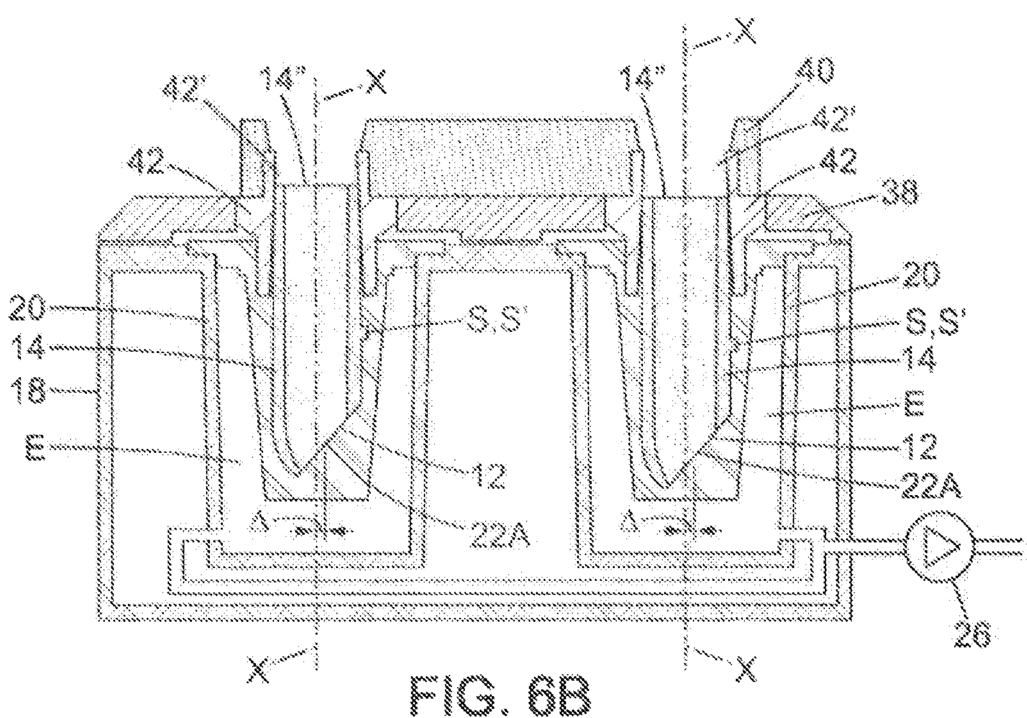
FIG. 6B is a sectional view of the base of the device of FIG. 5 with the central part poured in the sheath.
Figure 7:
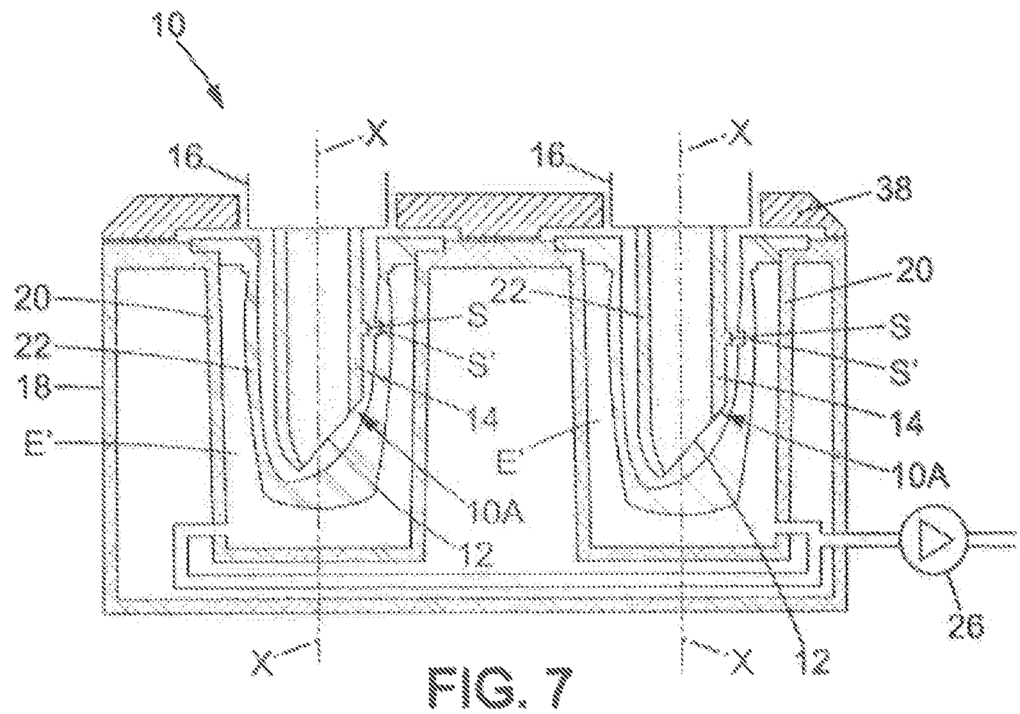
FIG. 7 is a sectional view of the base of the device of FIG. 5 with the central part poured in the sheath.
Figure 8:
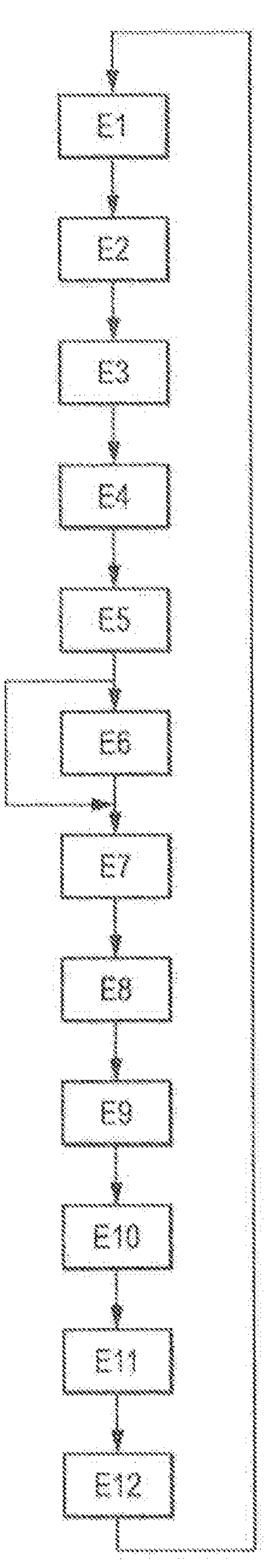
FIG. 8 is a timing diagram schematically illustrating the steps of the method according to the invention.

As can be seen more clearly in FIG. 1A, the sheath 14 of the stick of cosmetic product 10 has a decorative surface portion S in relief on the side surface 10C of the stick of cosmetic product 10. Relief is understood here to mean that the decorative surface portion S is protruding, as shown in FIGS. 1A and 1B, or recessed, as shown in FIGS. 5 to 7, so as to form at least one undercut when demolding along the axis of the stick of cosmetic product 10.

The stick of cosmetic product 10 has a free end 10A and, opposite thereto, an end 10B which is fixed to a dispensing mechanism 16 of known type. End 10A may have the shape of a nose cone. The stick of cosmetic product 10 may be beveled at the free end 10A, as is best seen in FIG. 1B. This bevel is off-centered because of the domed shape of the nose-cone end of the stick of cosmetic product 10.

Furthermore, the sheath 14 may have, at the beveled free end 10A, a constant thickness around the central part 12 measured in the plane of the bevel. More particularly, at the beveled free end 10A, the sheath 14 has a thickness 14' which is constant all around the central part 12. Below, the manner in which it is possible to have this consistency of thickness while the free end 10A is beveled will be described.

The cross-section of the stick is preferably circular, but could have any other shape.

Similarly, the cross-section of the central part is preferably circular, but could have any other shape, for example oval, tear-shaped, polygonal, particularly a star shape.

Figure 2:
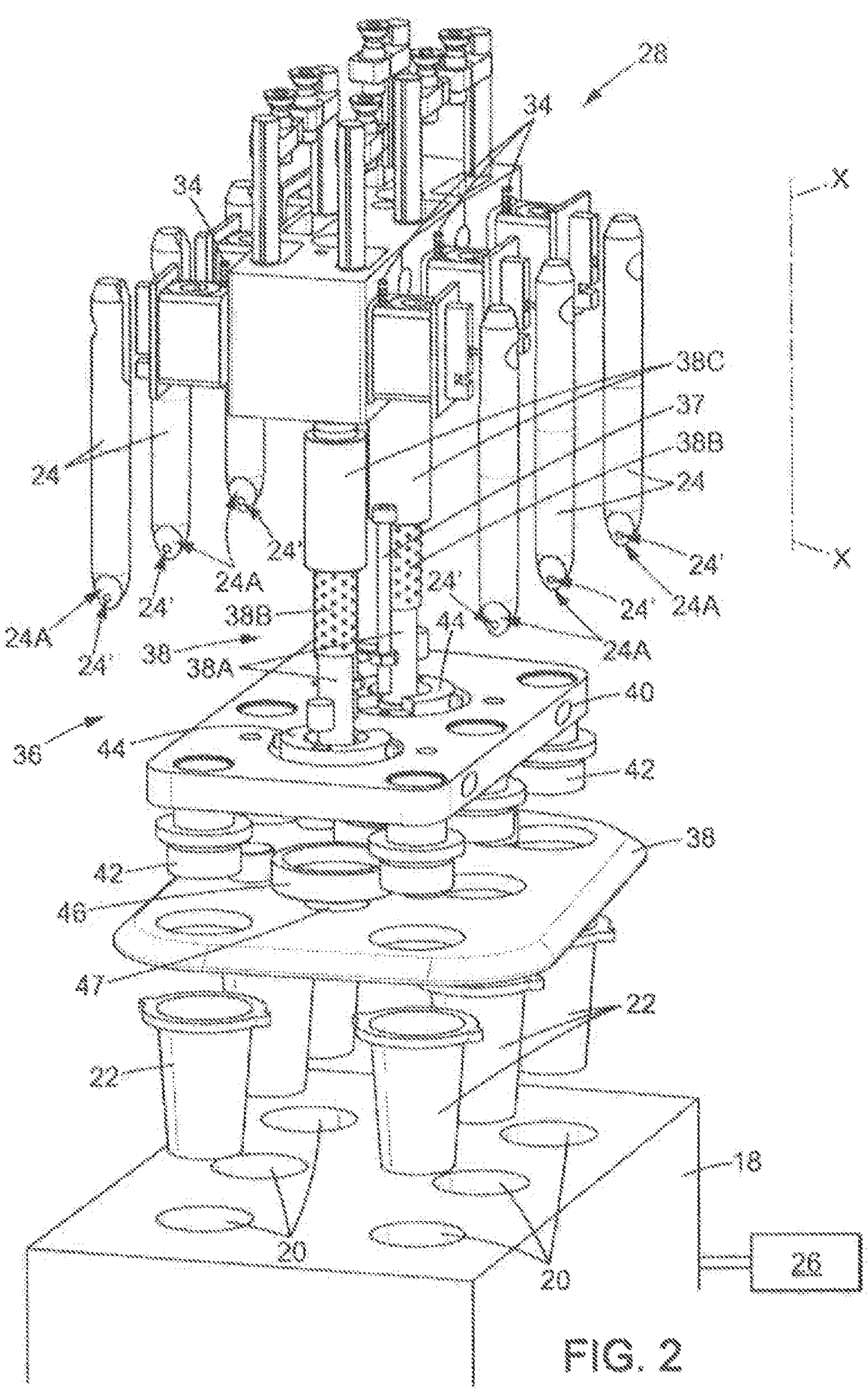
FIG. 2 is an exploded perspective view of the device according to the invention, illustrating the method according to the invention.

FIG. 2 shows an exploded view of the device according to the invention which enables implementing the method according to the invention.

The device according to the invention makes it possible to manufacture a stick of cosmetic product 10 as described above. The device thus makes it possible to manufacture a stick of cosmetic product 10, in particular of lipstick, comprising two compositions A and B, extending along a longitudinal axis (X-X), but also a stick of cosmetic product, in particular of lipstick, of the central part-sheath type. In the following, the description is of a device for manufacturing a stick of cosmetic product 10 of the central part-sheath type, but it is understood that the description is not limited to this type of stick of cosmetic product, but can be applied to any type of stick of cosmetic product comprising two compositions A and B.

The device comprises a base 18 comprising a cavity 20 formed in the base 18. Preferably, the base 18 comprises a plurality of cavities 20 thus allowing the simultaneous manufacture of several sticks of cosmetic product 10 according to the invention. In the current case, as shown in the figures, the base 18 has six cavities 20, but it could have a different number (lower or higher).

The device according to the invention further comprises an elastic cup 22 which is received in the cavity 18. For reasons of physicochemical compatibility with the different compositions A and B, the cup 22 will preferably be formed of a material having the elasticity necessary for deformation in order to extract the stick of cosmetic product and having no risk of interaction with these compositions, such as rubber or silicone.

The cup 22 has a surface in relief (not shown) which is complementary to the surface in relief S created on the sheath 14. In the current case, as illustrated in the figures, when the surface in relief S of the stick of cosmetic product 10 is protruding, the surface in relief S' of the cup 22 is recessed. Conversely, when the surface in relief of the stick of cosmetic product 10 is recessed, the surface in relief of the cup 22 is protruding.

As shown in the figures, the device according to the invention may comprise six elastic cups 22 which are each received in one of the six cavities 18. Each of the cups 22 has a surface in relief S' which is complementary to the surface in relief S created on the sheath 14.

Figure 3A:
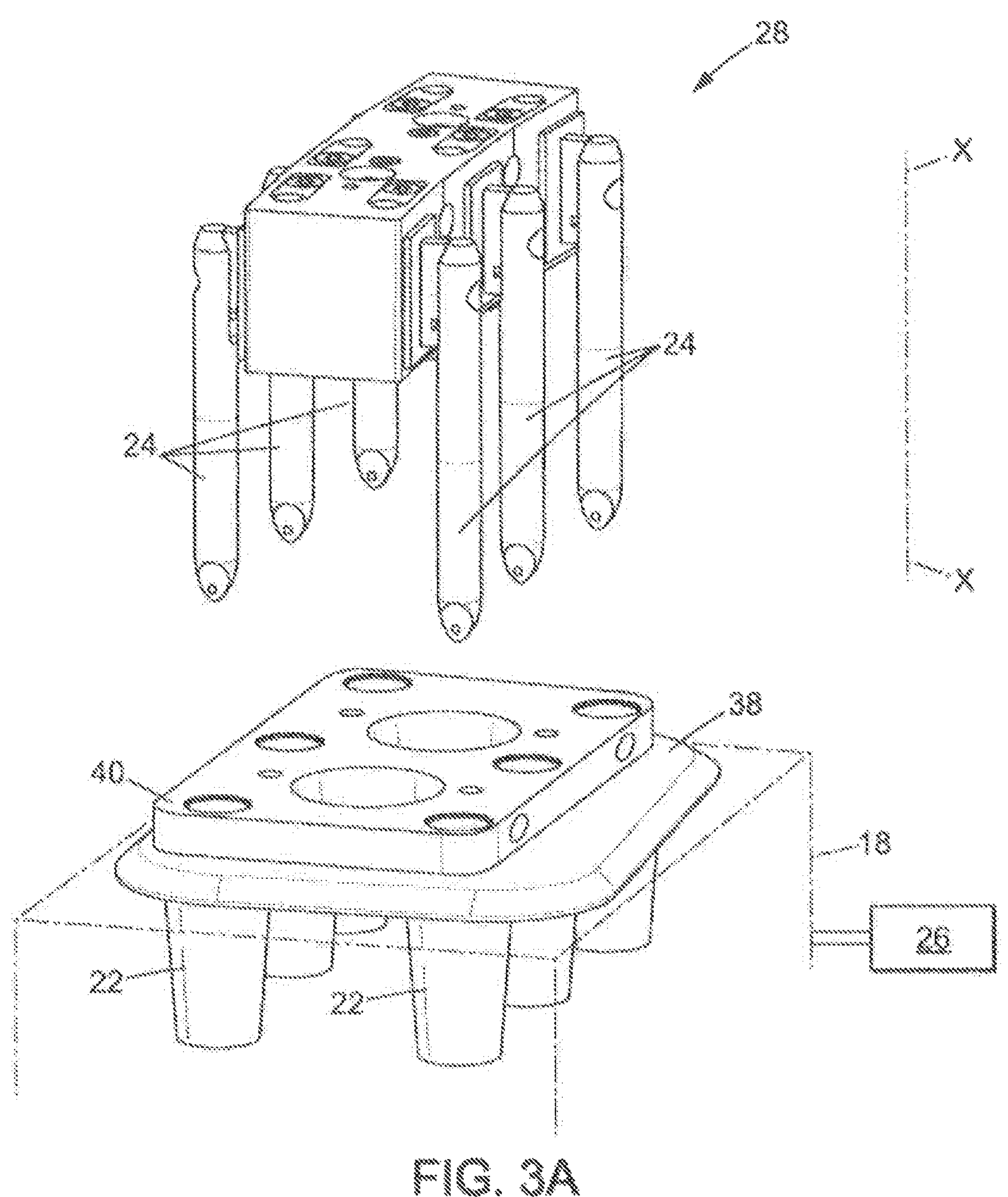
FIG. 3A is a perspective view of the device of FIG. 2, the cores being outside the cups.
Figure 3B:
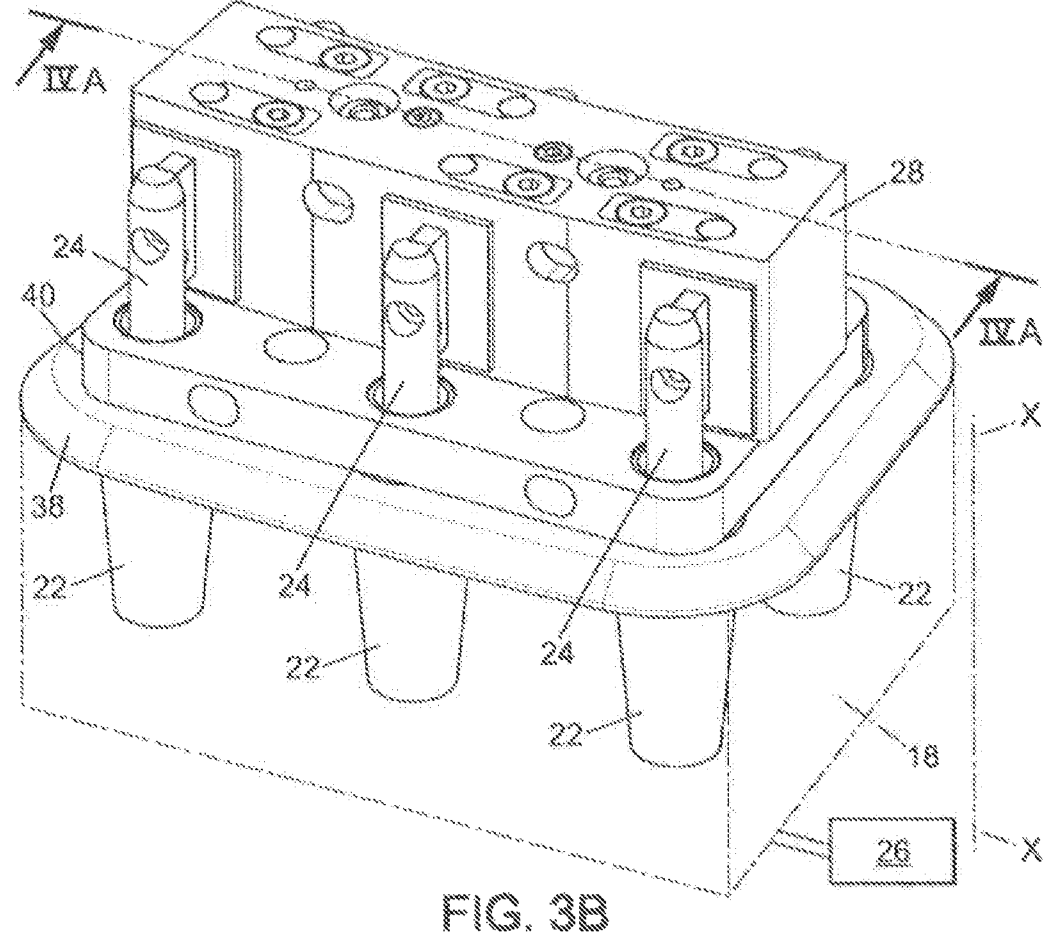
FIG. 3B is a perspective view of the device of FIG. 2, the cores being inserted in the cups.

The device according to the invention further comprises a core 24 which is movable in translation along a longitudinal axis X-X, between an inserted position as illustrated in FIG. 3B, in which the core is positioned in the cup 22, and a withdrawn position as illustrated in FIG. 3A, in which the core is withdrawn from the cup 22. The core 24 is preferably made of metal, for example steel or aluminum, which may have a coating made for example by anodizing. In the current case, as shown in the figures, the device according to the invention comprises six cores 24 which are each received in one of the six cups 22.

The device further comprises a means 26 for deforming the cup 22 in order to be able to extract a stick of cosmetic product from the cup without damaging the decorative surface portion S in relief. In the current case, the means 26 allows deforming each of the six cups 22.

Each cup 22 is of a size smaller than that of the cavity 20, so as to define a space E between each of the cups 22 and the corresponding cavity 20. The means 26 makes it possible to create a negative pressure in the spaces E and thus deform each of the cups 22 and allow easily demolding the stick of cosmetic product 10 without damage, as illustrated in FIG. 7. The means 26 is of a known type and may comprise a vacuum pump, pipes, and check valves.

Such a device thus makes it possible to simultaneously produce six sticks of cosmetic product 10 according to the invention.

For the following, the description is for a cup 22 arranged in a cavity 20 with a core 24, but it is understood that the description also applies to the plurality of cups 22 arranged in a plurality of cavities 20 with a plurality of cores 24.

To produce a beveled surface 10A of the central part 12 surrounded by a sheath 14 at the free end 10A, it is necessary for the core 24 to come into contact with the bottom of the cup 22. For this purpose, the core 24 has a beveled free end 24A of equivalent shape to the beveled free end 10A of the stick of cosmetic product 10. The same is true for the interior of the cup 22 which also has a corresponding beveled inner surface 22A. Thus, when the core 24 is inserted into the cup 22, the free end 24A of the core 24 comes into contact with the beveled inner surface 22A of the cup 22. This contact prevents the composition A of the sheath 14 from passing between the free end 24A of the core 24 and the beveled inner surface 22A of the cup 22; in the absence of contact the central part 12 would not be visible at the free end 10A because it would be completely covered by the sheath before its initial uses.

Moreover, in order to guarantee a constant thickness 14' of the sheath 14 around the central part 12 at the free end 10A, it is necessary to offset the core 24 from the longitudinal axis X-X, as is best visible in FIG. 5. For this purpose, an offset A may be provided between the longitudinal axis X-X and the axis X12-X12 of the central part 12. The axis X12-X12 of the central part 12 is defined as being the axis which passes through the stick of cosmetic 10 equidistant from the side walls 12C of the central part 12 (FIG. 1B). This axis is therefore defined outside the region of the oblique surface 10A.

As the cup 22 is elastic, to prevent it from being pulled along by suction when the core 24 moves from the inserted position (FIG. 3B) to its withdrawn position (FIG. 3A), the core 24 has an air outlet channel 24' (or vent) leading between the free end 24A of the core 24 on the bevel and a portion of the core 24 outside the cup 22 when the core 24 is inserted into said cup 24 and thus enabling the core 24 to vent and avoiding the suction effect.

In addition, as the cup 22 is elastic, in order to ensure contact between the free end 24A of the core 24 and the beveled inner surface 22A of the cup 22 and prevent the cup 22 from deforming under excessive pressure of the core 24, the device comprises means for adjusting the pressure 25 of the core 24 in the cup 22.

For this purpose, the core 24 is mounted so as to slide on a block 28 via a pressure adjustment means 25 comprising a bearing 30 and a rod 32; the pressure adjustment means 25 of the core 24 further comprises a spring 34 for exerting pressure on the bearing 30 and thus regulating the pressure exerted by the core 24 in the bottom of the cup 22. The characteristics of the spring 34 are chosen according to the dimensions of the core 24 and cup 22 and the elasticity of the cup 22. The elasticity of the spring 34 is adapted so that the movement of the pin relative to the core 24 is stopped before deformation of the core 24 while the movement of the block 28 continues its travel into place. The spring 34 is preferably a compression spring.

The sliding travel of the core is less than 5 mm, for example equal to 2 mm. When the core 24 is properly in place in the cup 22, the pressure adjustment means 25 is advantageously substantially at the halfway point.

Each core 24 is independent. Thus, with reference to FIG. 5, the two illustrated cores 24 are at different heights. In the current case, a difference 8 of greater or lesser value and possibly zero is thus visible in FIG. 5 between the two cores 24 shown. This difference 8 is present between the free ends 24A of the core coming into contact with the beveled inner surface 22A of the cup 22. This difference is also present at the bearings 30. This difference in height is related to the difference in compression of the two springs 34. This difference may be due for example to differences between the cups 22, in particular due to their manufacturing tolerances.

The device further comprises a flange 38 and a reducing plate 40. As is best seen in FIGS. 5 to 7, the flange 38 is intended to remain on the base 18 in order to maintain the cup 22, while the reducing plate 40 is intended to be removed after creating the stick of cosmetic product 10, to allow attaching the latter to a dispensing mechanism 16 before demolding the stick of cosmetic product 10 from the cup 22.

The flange 38 is held to the base 18 for example by magnetization.

The reducing plate 40 may be arranged and centered on the flange 38 by a centering pin 42 fixed to the reducing plate 40. In the current case, there are as many centering pins 42 as there are cores 24 and cups 22. Indeed, as is best seen in FIG. 5, the pin 42 is inserted through the flange 38 into the cup 22. The pin 42 is of course provided with an access opening 42' allowing the passage of the core 24 through the pin 42 and the filling with composition A to form the sheath 14.

The reducing plate 40 may be held to the flange 38 by magnetization.

To ensure proper positioning of the core 24 in the cup 22, the device, and in particular the block 28, may further comprise a means for guiding in translation and for centering 36 the core 24 in the cup 22.

The means for guiding in translation and for centering 36 comprises one or more rings for guiding in translation and for centering 44, intended for insertion into housings 46 provided on the flange 38. In the current case, two rings for guiding in translation and for centering 44 may be provided, intended to fit into two corresponding housings 46. These rings 44 make it possible to center the block 28 against the base 18 (via the flange 38 and the reducing plate 40). The rings for guiding in translation and for centering 44 fit into the slightly frustoconical housings 46 in order to facilitate the guiding and centering. The ring 44 may be made of metal and is held to the base 18 by the flange 38 by means of magnets 47 positioned on the flange 38 and facing the housings 46 of the reducing plate 40, the block 28 then being held fixedly against the base 18.

The means for guiding in translation and for centering 36 may be retractable, thus making it possible to retract between the inserted position (FIG. 3B) and the withdrawn position (FIG. 3A) of the core 24.

Figure 4A:
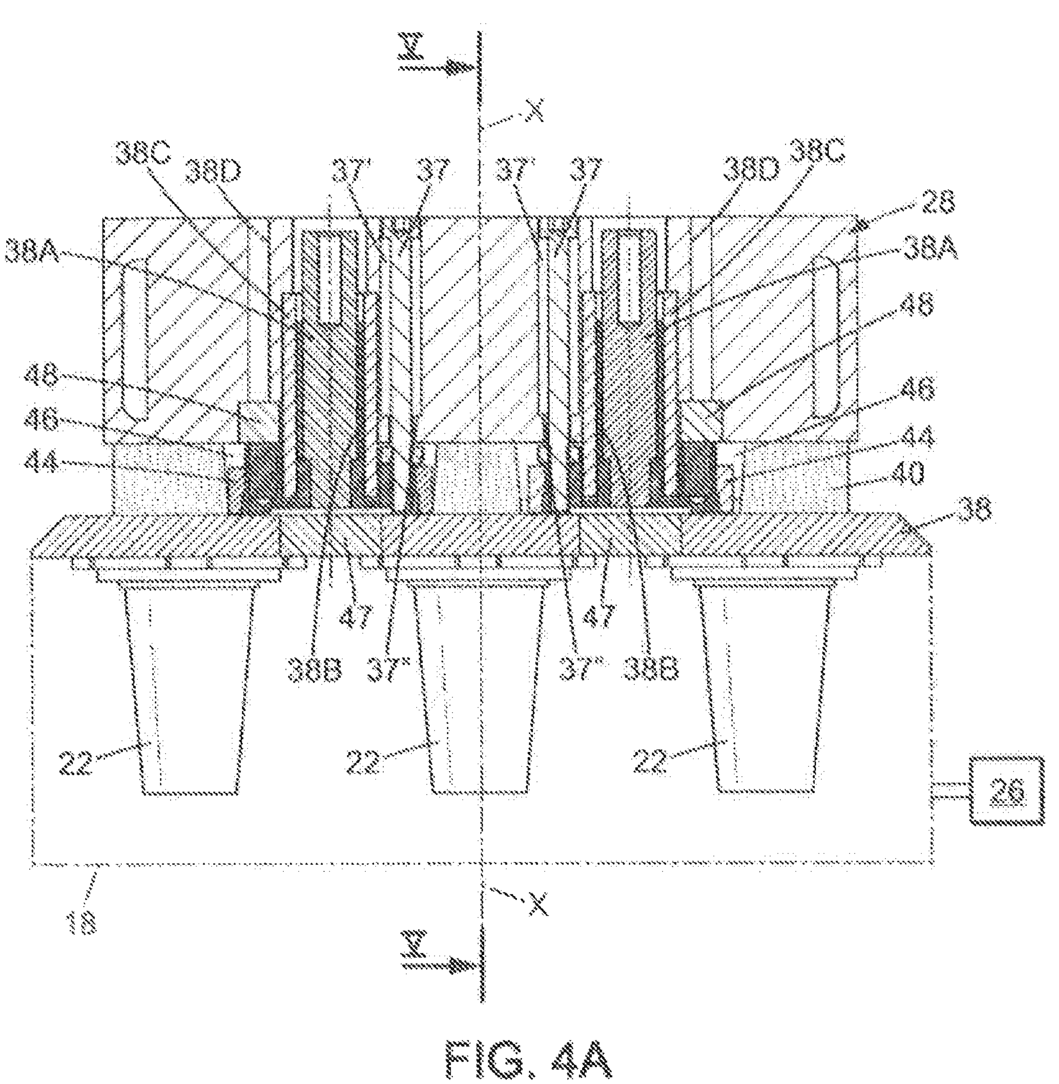
FIG. 4A is a partial sectional view of the device of FIG. 3B along line IV-IV, the means for guiding in translation and for centering being retracted, the cores not shown for better visibility.

Moreover, the rings 44 are magnetic so that the means for guiding in translation and for centering 36 can be held in the retracted position relative to the block 28 by a magnetic effect using magnets 48 provided on the block 28 and/or on the means for guiding in translation and for centering 36, as is best seen in FIG. 4A.

When the core 24 moves from the withdrawn position to the inserted position, the block 28 draws closer to the base 18, in this case to the reducing plate 40, so that each core 24 is gradually inserted into the corresponding cup 22.

Once the rings 44 are nested in the housings 46, the means for guiding in translation and for centering 36 having previously been retracted, the core 24 has reached its inserted position in the cup 22 (FIG. 4A).

For this purpose, the means for guiding in translation and for centering 36 may comprise a sliding assembly 38, more specifically a pair of sliding assemblies 38. Each sliding assembly is formed of a sliding rod 38A mounted so as to slide in translation in a guide bearing 38C embedded in the block 28, by means of a slide 38B or other bearings or ball bearing cages.

Figure 4B:
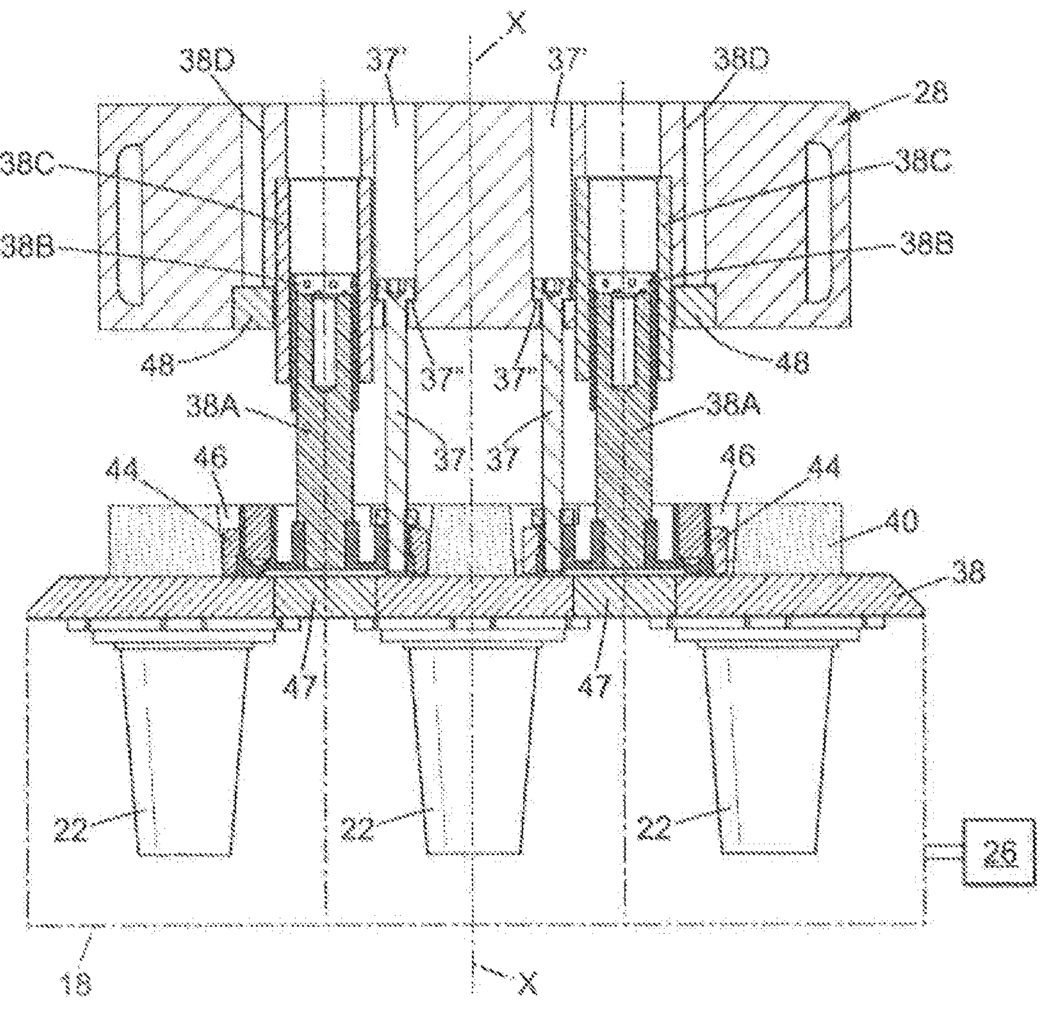
FIG. 4B is a partial sectional view of the device of FIG. 3B along line IV-IV, the means for guiding in translation and for centering being deployed and in contact with the reducing plate, the cores not shown for better visibility.
Figure 4C:
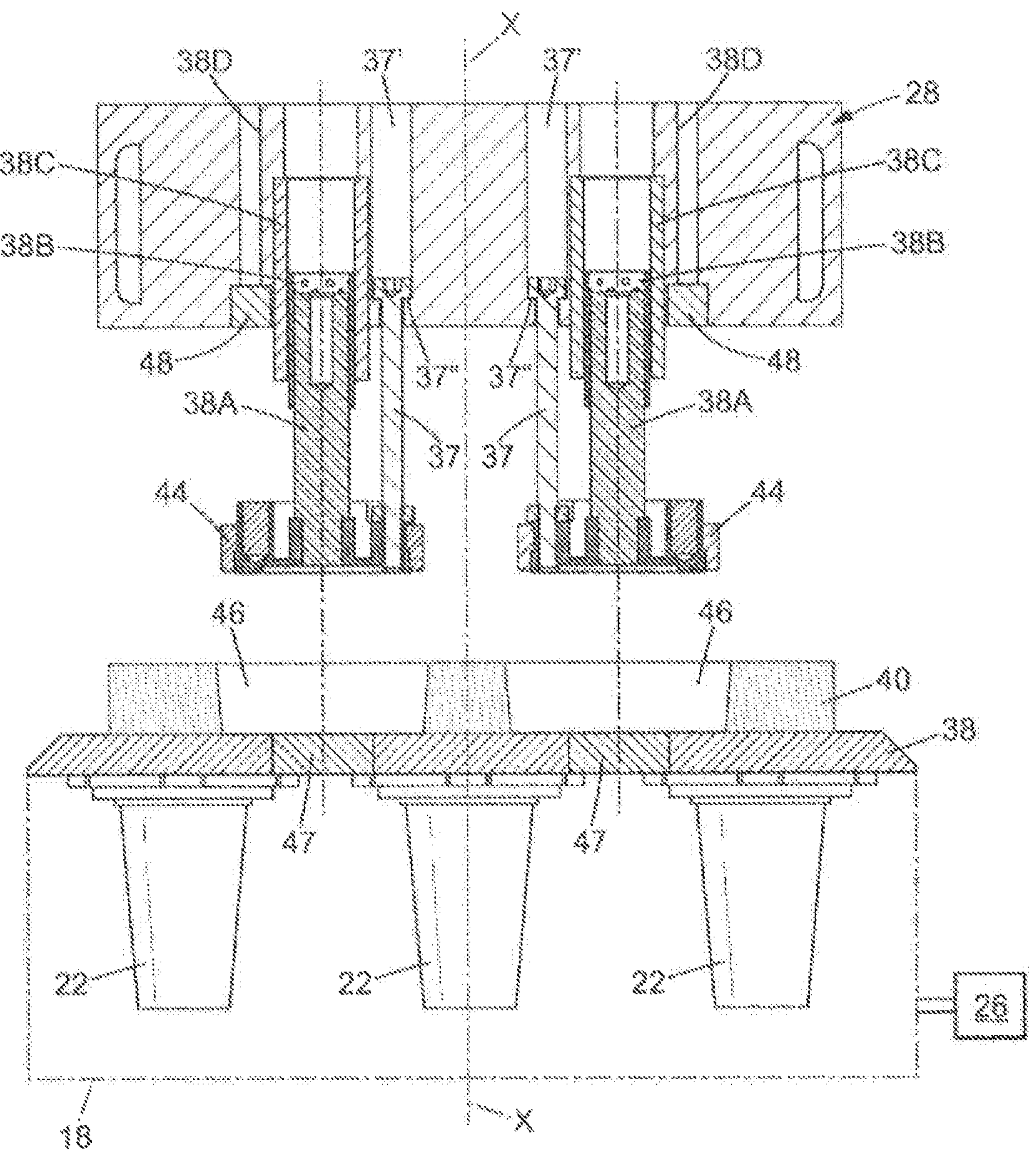
FIG. 4C is a partial sectional view of the device of FIG. 3B along line IV-IV, the means for guiding in translation and for centering being deployed and at a distance from the reducing plate, the cores not shown for better visibility.

With reference to FIGS. 4A to 4C, the block 28 comprises a housing 38D in which the guide bearing 38C is embedded and with respect to which the rod 38A is able to slide along the longitudinal axis X-X; the rod 38A can thus be retracted into the block 28 by sliding.

We will now describe the steps of the method for manufacturing a cosmetic product 10 according to the invention. The means for carrying and pouring or injecting compositions A and B will not be described, these means being of known type. The method thus makes it possible to manufacture a stick of cosmetic product 10, in particular of lipstick, comprising two compositions A and B, extending along a longitudinal axis (X-X), but also a stick of cosmetic product, in particular of lipstick, of the central part-sheath type. In the following, the description is of a method for manufacturing a stick of cosmetic product 10 of the central part-sheath type, but it is understood that the description is not limited to this type of stick of cosmetic product, but can be applied to any type of stick of cosmetic product 10 comprising two compositions A and B.

In a step E1, the means for guiding in translation and for centering 36 is retracted and the cores 24 are lubricated beforehand with a lubricant material to prevent the compositions A and B from adhering thereto. For this purpose, the cores 24 are coated with silicone. In order to allow contact between the free end 24A of the core 24 and the beveled inner surface 22A of the cup 22, it may be provided that the free end 24A of the core is not covered with silicone. The coating may be achieved by spraying.

In a step E2, the reducing plate 40 (and the centering pins 42 attached thereto) is placed on the flange 38 which itself is arranged on the base 18.

In a step E3, the block 28 is brought above the base 18, in the current case above the reducing plate 40, for example by means of a robotic arm (not shown).

In a step E4, the block 28 is then lowered along the longitudinal axis X-X to approach the means for guiding in translation and for centering 36 of the base 28, in this case the reducing plate 40, each core 24 gradually being inserted into the corresponding cup 22. The block 28 stops its approach when the rings for guiding in translation and for centering 44 of the means for guiding in translation and for centering 36 are in position in the housings 46.

The rings for guiding in translation and for centering 44 are inserted into the housings 46 and are held by magnetization against the flange 38, the block 28 then being held fixedly against the base 18. Each core 24 is then in contact with the beveled inner surface 22A of the cup 22 without deforming the cup, due to the corresponding pressure adjustment means 25. Each core 24 comes into contact with the beveled inner surface 22A of the cup 22 before the block 28 stops its approach (FIGS. 3B, 4A and 5).

Once the core 24 is in place inside the cup 22, in other words is in the inserted position, in step E5 a filling head (not shown) is brought to engage with an access opening 42' provided in the cup 22, and an amount of product of composition A is poured or injected into the cavity C (available volume between the core 24 and the cup 22), substantially corresponding to the volume of said cavity C (FIG. 5). During this pouring or injection step, the product of composition A enters into the cavity C, expels the air initially present therein, and comes into contact with the surface in relief S' of the cup 22.

A preheating or cooling step (step E6) of the cup 22 may possibly be provided, performed before the step of pouring or injecting composition A.

Next follows a step of cooling and at least partial solidification (step E7) of the composition A thus poured. After cooling and at least partial solidification, the cosmetic product poured in the cavity C adheres to the cup 22 in its fill area due to contact with the peripheral wall and the bottom of the cup 22. It may be provided that the access opening 42' provided in the pins 42 is slightly conical, narrowing towards the bottom of the stick of cosmetic 10, i.e. end 10B of the stick of cosmetic 10. This reduces the diameter of the stick of the stick of cosmetic 10 in order to fit on the dispensing mechanism 16, and inherently it also plays a role in retaining the sheath when the core is removed.

The block 28 is then raised along the longitudinal axis X-X (step E8), the magnets 48 are moved away from the means for guiding in translation and for centering 36 which progressively stretch, the cores 24 still being in the cups 22, until fully deployed, the cores 24 then being out of the cups 22. The fully deployed position of the means for guiding in translation and for centering 36 is defined by a travel limiter of the sliding assemblies 38. For this purpose, the device may comprise screws 37 which are able to slide in bores 37' provided in the block 28 and to abut against a shoulder 37" provided in the bores 37' and which are screwed to the rings for guiding in translation and for centering 44. When the screws 37 abut against the shoulders 37" in the bores 37' (see FIG. 4B), the rings for guiding in translation and for centering 44 are still housed in the housings 46.

As the block 28 continues to move away until the cores 24 have reached their withdrawn position, along the longitudinal axis X-X of the base 18 (in the current case the reducing plate 10), the screws 37 being in abutment, the rings for guiding in translation and for centering 44 are withdrawn from the housings 46 by means of the screws 37 (see FIG. 4C). It may be provided that the magnets 48 maintaining the retracted position have a smaller magnetic force than the magnets 47 holding the ring 44 in the housing 46. The means for guiding in translation and for centering 36 allows rectilinear extraction of the cores 24, which avoids damage to the sheath 14 all the way to the withdrawn position (FIGS. 3A, 4C and 6A).

When the core 24 is withdrawn from the cup, the beveled inner surface 22A of the cup 22 which is in contact with the free end 24A of the core 24 may be drawn with the core 24 due to suction. The inside of the sheath 14 from which the core 24 is removed, could then be damaged. To avoid this disadvantage, the core 24 is vented by means of the air outlet channel 24' (or vent) leading to the free end 24A of the core 24.

As soon as the cores 24 are in the withdrawn position, the block 28 is moved away from the base 28 by displacement means (not shown). The aforementioned coating with silicone is then repeated on the cores 24 (step E1). The means for guiding in translation and for centering 36 is then retracted into the retracted position by retraction means (not shown).

When the core 24 is removed from the cup 22 (see FIG. 6A), it leaves a cavity C' formed inside the sheath 14. This cavity C' has an access opening 14" which can then be filled with composition B.

Then (step E9) a second filling head (not shown) is brought to engage with access opening 14" and a quantity of a second composition product B is poured or injected into the second cavity C', substantially corresponding to the volume of said second cavity C'. During this pouring or injection step, the second composition product B enters into the second cavity C' and adheres to the sheath 14 (composition A) at their contact interface (see FIG. 6B).

Preferably, the second cosmetic product (composition B) poured inside the sheath 14 has a melting point less than or equal to that of the first cosmetic product (composition A). This prevents the second cosmetic product (composition B) poured inside the sheath 14 from melting the first cosmetic product (composition A). In this case, the adhesion between the central part 12 and the sheath 14 can be obtained by friction or chemical reaction between compositions A and B, at the interface of the central part 12 and sheath 14.

Otherwise, it may be provided that the second cosmetic product (composition B) poured inside the sheath 14 has a slightly higher melting point than the first cosmetic product (composition A). In this manner, when the second cosmetic product (composition B) is poured inside the sheath 14, it locally melts the first cosmetic product (composition A). In this case, the adhesion between the central part 12 and sheath 14 can be obtained by the melting/mixing between compositions A and B, at the interface of the central part 12 and sheath 14.

A new step of cooling and solidification (step E10) of the poured second cosmetic product (composition B) then follows. The second cosmetic product (composition B) poured into the second cavity C then adheres to the first cosmetic product (composition A) poured during the first cycle, so as to form an integral assembly with said cosmetic product (composition A) poured during the first cycle, namely the stick of cosmetic product 10 according to the invention.

Before demolding the stick of cosmetic product 10 from the cup 22, the reducing plate 40 and therefore the centering pin 42 fixed to the reducing plate 40 is removed in step E11, to allow fixing the stick of cosmetic product 10 to a dispensing mechanism 16, as illustrated in FIG. 7. Manipulation of the reducing plate may be done by a robotic arm (not shown in the figures).

In order to be able to extract the stick of cosmetic product 10 from the cup 22 without damaging the decorative surface portion S in relief, the means 26 for deforming the cup 22 is actuated in order to deform each of the six cups 22 (step E12), as illustrated in FIG. 7. Under the effect of suctioning the air, the space E present between the cup 22 and the cavity 20 is reduced to a space E' and the cup 22 is deformed due to its elasticity under the effect of this pressure. The surface in relief S' of the cup 22 is thus also removed from the surface in relief S formed on the sheath 4 of the stick of cosmetic product 10.

As soon as the cup 22 is deformed, it is moved away from the sheath 14 and central part 12 and the demolding of the stick of cosmetic product 10 can be achieved without damaging the stick of cosmetic product 10, and in particular without damaging the surface in relief S.

After demolding, the surface in relief S forms a decorative pattern in relief on the face of the obtained stick of cosmetic product 10 which is exposed to the user.

The manufacturing cycle can then go back to the beginning of the method described above (steps E1 to E12).

A machine with rotating tables may be used to implement this method, the bases 18 then moving from station to station for the implementation of each step E1 to E12.

The invention claimed is:

1. A method for manufacturing a stick of cosmetic product, in particular of lipstick, comprising two compositions A and B, extending along a longitudinal axis, the stick having a side surface presenting a decorative surface portion in relief, the method including:

a step of placing a core in an elastic cup having a surface portion in relief, the core coming into contact with the bottom of the cup, a step of pouring or injecting a composition A between the core and the cup so as to form a first member, a step of removing the core from the cup, a step of pouring or injecting a composition B so as to form a second member, thereby forming a stick of cosmetic product, and a step of deforming the cup so as to demold the stick of cosmetic product.

2. The method according to claim 1, enabling the manufacture of a stick of cosmetic product, in particular of lipstick, of the central part-sheath type, the two compositions A and B being arranged relative to one another to form a central part surrounded by a sheath along the longitudinal axis, the sheath having a side surface presenting the decorative surface portion in relief, the method including:

said sheath is formed during said step of pouring or injecting a composition A between the core and the cup, said central part is formed during said step of pouring or injecting a composition B into the sheath.

3. The method for manufacturing a stick of cosmetic product according to claim 1, further comprising a step of lubricating the core.

4. The method of claim 1, using a device comprising:

a base having a cavity formed in the base, said elastic cup received in the cavity, the cup having a surface in relief, said core movable in translation between:

an inserted position in which the core is positioned in the cup, for pouring or injecting said composition A between the core and the cup so as to form a first member, the core coming into contact with the bottom of the cup, and a withdrawn position in which the core is withdrawn from the cup for pouring or injecting said composition B so as to form a second member, thereby forming a stick of cosmetic product, and a vacuum pump for deforming the cup so as to demold the stick of cosmetic product.

5. The method of claim 4, wherein the cup is of a size smaller than that of the cavity so as to define a space between the cup and the cavity, and wherein at said step of deforming the cup, said vacuum pump creates negative pressure in said space.

6. The method of claim 4, wherein the core has an air outlet channel leading between: the end of the core in contact with the inner surface of the cup, and a portion of the core outside the cup when the core is inserted into said cup.

7. The method of claim 4, wherein the device further comprises a pressure adjustment device which adjusts a pressure of the core in the cup when said core is inserted in said elastic cup.

8. The method of claim 7, wherein said pressure adjustment device comprises a spring.

9. The method of claim 4, wherein said device further comprises at least one ring guiding the core in translation and centering said core in the cup.

10. The method according to claim 9, wherein said at least one ring is retractable.

11. The method according to claim 10, wherein the device further comprises at least one magnet which maintains the at least one ring in a retracted position.

12. The method according to claim 9, wherein the core and the at least one ring are mounted on a block.

13. The method according to claim 9, wherein said at least one ring comprises a centering ring which engages with a housing provided in the base.

14. The method according to claim 4, wherein the device comprises a plurality of cavities, a plurality of elastic cups each having a surface in relief, and a plurality of cores, wherein the plurality of cavities are formed in the base, wherein each of the cups is received in each cavity, and wherein each of the cores is movable in translation between said inserted position in which the cores are positioned in the cups and said withdrawn position in which the cores are withdrawn from the cups.

* * * * *